US012330525B2

(12) United States Patent
Upton

(10) Patent No.: US 12,330,525 B2
(45) Date of Patent: *Jun. 17, 2025

(54) APPARATUS AND METHOD FOR ASSEMBLY LINE CHARGING OF VEHICLE BATTERIES

(71) Applicant: TOYOTA MOTOR ENGINEERING & MANUFACTURING NORTH AMERICA, INC., Plano, TX (US)

(72) Inventor: Daniel Upton, Georgetown, KY (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,316

(22) Filed: Jul. 10, 2023

(65) Prior Publication Data

US 2023/0347780 A1  Nov. 2, 2023

Related U.S. Application Data

(63) Continuation of application No. 16/867,888, filed on May 6, 2020, now Pat. No. 11,724,618.

(51) Int. Cl.
*B60L 53/66* (2019.01)
*B60L 53/12* (2019.01)
*B60L 53/63* (2019.01)

(52) U.S. Cl.
CPC ............... *B60L 53/66* (2019.02); *B60L 53/12* (2019.02); *B60L 53/63* (2019.02)

(58) Field of Classification Search
CPC ........................................................ B60L 53/66
(Continued)

(56) References Cited

U.S. PATENT DOCUMENTS 4,334,819 A   6/1982   Hammerslag
5,574,354 A   11/1996  Kohchi
(Continued)

FOREIGN PATENT DOCUMENTS

DE   10 2005 057 706 A1   6/2007
DE   10 2017 009 715 A1   4/2018
DE   10 2018 008 029 A1   4/2019

*Primary Examiner* — Edward Tso
*Assistant Examiner* — Ahmed H Omar
(74) *Attorney, Agent, or Firm* — Oblon, McClelland, Maier & Neustadt, L.L.P.

(57) ABSTRACT

The present disclosure relates to an apparatus and method for assembly line charging of vehicle batteries. In an embodiment, the method includes receiving battery data of a plurality of vehicle batteries on an assembly line, the received battery data including electric charge data of each vehicle battery of the plurality of vehicle batteries, each of the plurality of vehicle batteries being powered by a corresponding linear section of a stationary power transmitter line, calculating a vehicle battery charge of each of the plurality of vehicle batteries based on the received electric charge data, evaluating the calculated vehicle battery charge of each of the plurality of vehicle batteries relative to associated vehicle battery charge parameters, and adjusting a power supplied to the corresponding linear section of the stationary power transmitter line based on the evaluation of the calculated vehicle battery charge of each of the plurality of vehicle batteries.

20 Claims, 14 Drawing Sheets

(58) Field of Classification Search
USPC .......................................................... 320/104
See application file for complete search history.

(56) References Cited

U.S. PATENT DOCUMENTS

| | | | | |
|---|---|---|---|---|
| 5,739,667 | A * | 4/1998 | Matsuda | H02J 7/007182 |
| | | | | 320/128 |
| 5,927,938 | A * | 7/1999 | Hammerslag | B60K 1/04 |
| | | | | 180/68.5 |
| 9,796,280 | B2 * | 10/2017 | McCool | H02J 50/12 |
| 2005/0189921 | A1 * | 9/2005 | Bayne | H02J 7/0014 |
| | | | | 320/138 |
| 2009/0198372 | A1 | 8/2009 | Hammerslag | |
| 2018/0149703 | A1 * | 5/2018 | Tohara | H02J 7/0068 |
| 2018/0241237 | A1 | 8/2018 | Kemmann | |
| 2019/0391620 | A1 * | 12/2019 | Matsuo | G06F 1/1683 |
| 2020/0153284 | A1 | 5/2020 | Shi | |

* cited by examiner

APPARATUS AND METHOD FOR ASSEMBLY LINE CHARGING OF VEHICLE BATTERIES

CROSS-REFERENCE TO RELATED APPLICATIONS

This application is a continuation of U.S. application Ser. No. 16/867,888 filed May 6, 2020, the entire contents of which are incorporated herein by reference.

BACKGROUND

Prior to delivery of an electric vehicle, for instance, a vehicle performance confirmation is needed. Accordingly, it is necessary to charge vehicle batteries to a sufficient level to allow for vehicle performance evaluation. Depending on available technology, however, charging may require a specific charging location following assembly and prior to evaluation where a vehicle may reside during charging. This requirement may add an additional space burden to the process. Adding to this that, due to regulations, batteries cannot be transported with a vehicle battery charge exceeding a predefined charge level, it becomes important to provide a more controlled vehicle battery charging system that eliminates inefficiencies of current processes. U.S. Pat. No. 4,334,819 entitled "Battery charging system" by Hammerslag is directed to a battery charging system for battery-powered, electric vehicles but fails to address the above-described shortcomings.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to assembly line charging of vehicle batteries.

According to an embodiment, the present disclosure further relates to an apparatus for assembly line charging of vehicle batteries, the apparatus comprising processing circuitry configured to receive battery data of a plurality of vehicle batteries on an assembly line, the received battery data including electric charge data of each vehicle battery of the plurality of vehicle batteries, each of the plurality of vehicle batteries being powered by a corresponding linear section of a stationary power transmitter line, calculate a vehicle battery charge of each of the plurality of vehicle batteries based on the received electric charge data of each vehicle battery, evaluate the calculated vehicle battery charge of each of the plurality of vehicle batteries relative to associated vehicle battery charge parameters, the vehicle battery charge parameters including a minimum vehicle battery charge and a maximum vehicle battery charge of each of the plurality of vehicle batteries, and adjust a power supplied to the corresponding linear section of the stationary power transmitter line based on the evaluation of the calculated vehicle battery charge of each of the plurality of vehicle batteries, wherein the adjusted power supplied to the corresponding linear section of the stationary power transmitter line is adjusted to optimize power distribution amongst linear sections of the stationary power transmitter line based on the evaluated vehicle battery charge of each of the plurality of vehicle batteries.

According to an embodiment, the present disclosure further relates to a method for assembly line charging of vehicle batteries, the method comprising receiving battery data of a plurality of vehicle batteries on an assembly line, the received battery data including electric charge data of each vehicle battery of the plurality of vehicle batteries, each of the plurality of vehicle batteries being powered by a corresponding linear section of a stationary power transmitter line, calculating a vehicle battery charge of each of the plurality of vehicle batteries based on the received electric charge data of each vehicle battery, evaluating the calculated vehicle battery charge of each of the plurality of vehicle batteries relative to associated vehicle battery charge parameters, the vehicle battery charge parameters including a minimum vehicle battery charge and a maximum vehicle battery charge of each of the plurality of vehicle batteries, and adjusting, by processing circuitry, a power supplied to the corresponding linear section of the stationary power transmitter line based on the evaluation of the calculated vehicle battery charge of each of the plurality of vehicle batteries, wherein the adjusted power supplied to the corresponding linear section of the stationary power transmitter line is adjusted to optimize power distribution amongst linear sections of the stationary power transmitter line based on the evaluated vehicle battery charge of each of the plurality of vehicle batteries.

According to an embodiment, the present disclosure further relates to a non-transitory computer-readable storage medium storing computer-readable instructions that, when executed by a computer, cause the computer to perform a method for assembly line charging of vehicle batteries, comprising receiving battery data of a plurality of vehicle batteries on an assembly line, the received battery data including electric charge data of each vehicle battery of the plurality of vehicle batteries, each of the plurality of vehicle batteries being powered by a corresponding linear section of a stationary power transmitter line, calculating a vehicle battery charge of each of the plurality of vehicle batteries based on the received electric charge data of each vehicle battery, evaluating the calculated vehicle battery charge of each of the plurality of vehicle batteries relative to associated vehicle battery charge parameters, the vehicle battery charge parameters including a minimum vehicle battery charge and a maximum vehicle battery charge of each of the plurality of vehicle batteries, and adjusting a power supplied to the corresponding linear section of the stationary power transmitter line based on the evaluation of the calculated vehicle battery charge of each of the plurality of vehicle batteries, wherein the adjusted power supplied to the corresponding linear section of the stationary power transmitter line is adjusted to optimize power distribution amongst linear sections of the stationary power transmitter line based on the evaluated vehicle battery charge of each of the plurality of vehicle batteries.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
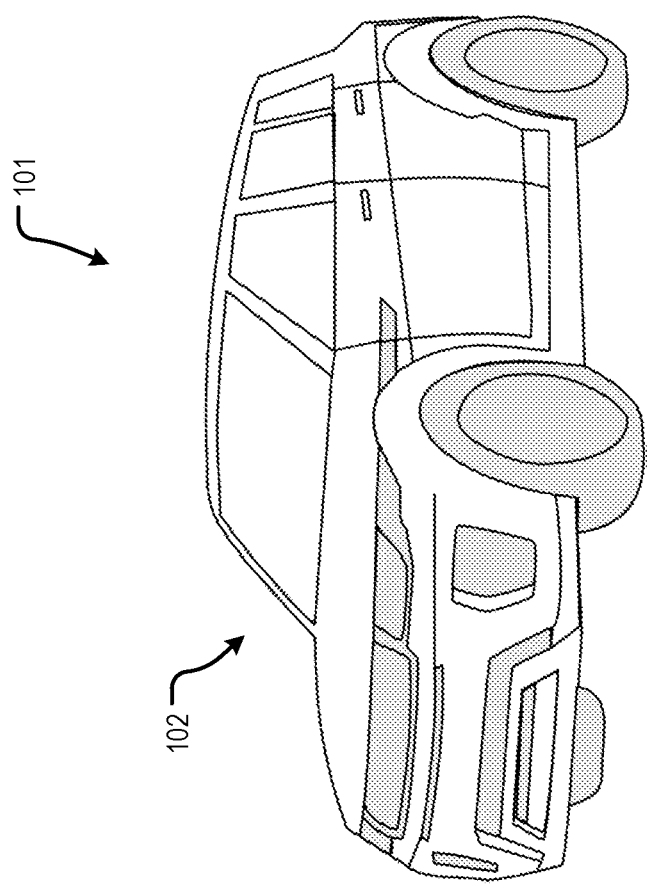
FIG. 1 is an illustration of a vehicle.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The terms "battery electric vehicle battery", "BEV battery", and "vehicle battery" may be used interchangeably through this specification and are used to describe similar components of the system.

According to an embodiment, the present disclosure relates to a method for charging a battery electric vehicle (BEV) battery during assembly of the BEV. The method may reduce or eliminate the need for specific dwell charging of the BEV battery prior to the end of the assembly line, as the BEV battery has been charged during assembly. As a result, the method of the present disclosure may reduce vehicles in process and conveyor length requirements.

Charging of BEV batteries is traditionally performed at a "stop station" or similar fixed location where a vehicle resides for the duration of battery charging. The "stop station" may be a supercharger or a BEV plug-in station, for instance. In order to provide charging of a BEV battery during assembly of a BEV, however, mobile charging arrangements must be developed. To this end, charging technologies developed outside of the context of the present disclosure may be implemented. For instance, it may be possible to, as described in the present disclosure, deploy inductive power transfer systems or brushed power transfer systems for charging of a BEV battery.

In an embodiment, the BEV battery may be charged by inductive power transfer systems via power receiver, or by inductive charging (i.e., wireless charging), while separate from the BEV. In an embodiment, the BEV battery may be charged by an inductive power transfer system following incorporation within the BEV, an inductive power receiver being used therebetween to transfer energy.

In an embodiment, the BEV battery may be charged while being transported between building stations, while in buffers, and/or while on an assembly line.

In an embodiment, the BEV battery may be charged by interaction of a power transfer receiver with a power transmitter line. The power transfer receiver may be connected to the BEV battery and may allow for wireless energy transfer between the power transmitter line and the BEV battery. Power transfer receivers may be disposed on or near the BEV battery and may be transported alongside the BEV battery as the BEV battery moves along an assembly line from station to station. In an embodiment, the BEV battery may be charged by interaction of the power transfer receiver with a linear section of a power transmitter line.

In an embodiment, the BEV battery may be charged by interaction of a power transfer receiver with a power transmitter line. In an embodiment, the BEV battery may be charged by interaction of the power transfer receiver with a linear section of a power transmitter line. The power transfer receiver may be connected to the BEV battery and may allow for wireless energy transfer between the power transmitter line and the BEV battery. Power transfer receivers may be disposed on or near the BEV battery and may be transported alongside the BEV battery as the BEV battery moves along an assembly line from station to station.

In an embodiment, and in addition to the power transfer receiver, the BEV battery may be coupled to a wireless communication unit for transmission of battery data to a power supply control device controlling a power supply connected to the power transmitter line. The power supply control device may include processing circuitry configure to control the system.

In an embodiment, and in addition to the power transfer receiver, the BEV battery may be coupled to a wireless communication unit for transmission of battery data to a power supply control device. The power supply control device, via a BEV battery controller or power receiver controller, may control a power supplied to the BEV battery. The power supply control device may include processing circuitry configure to control the system.

In an embodiment, the present disclosure considers various sizes and types of BEV batteries, as battery data, to allow the power supply control device to provide appropriate energy to each BEV battery.

In an embodiment, the present disclosure describes a mechanism by which non-value added time is minimized, dwell charging stations are eliminated, a need for increased buffer to vehicle performance line is eliminated, and early detection of defective BEV batteries is possible.

Referring now to the Figures, FIG. 1 is an illustration of a vehicle 101. In an embodiment, the vehicle 101 may be an electric vehicle 102 or a battery electric vehicle (BEV) 102. Following assembly and prior to being delivered to a customer, the BEV 102 must be submitted to a vehicle performance evaluation to ensure the BEV 102 is ready for the end user. In order to allow the vehicle performance evaluation to be performed, a vehicle battery of the BEV 102 must be charged to within a predetermined vehicle battery charge range.

As described, traditional methods may require a fully assembled BEV 102 to dwell at a charging station until the vehicle battery charge of the vehicle battery reaches the predetermined vehicle battery charge range. Only then, after some indefinite time, can the BEV 102 be subjected to the vehicle performance evaluation. As can be appreciated, such a delay introduces inefficiency into the BEV manufacturing process that is a target for improvement.

Figure 2A:
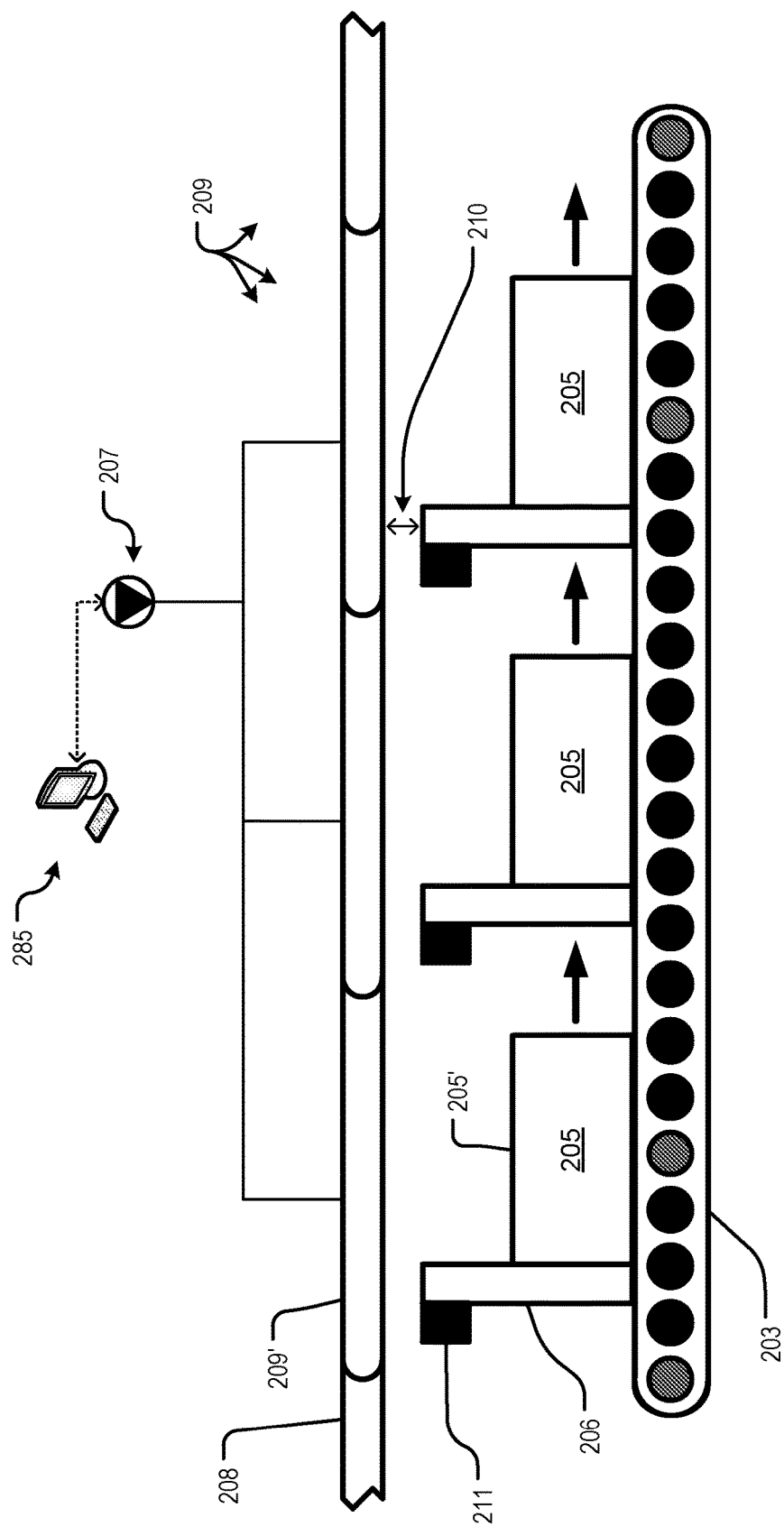
FIG. 2A is a schematic of an assembly line, according to an exemplary embodiment of the present disclosure.

Accordingly, as illustrated in FIG. 2A, a method of the present disclosure provides an approach for allowing vehicle battery charging during normal assembly line operations, thus allowing charging concurrent with BEV assembly. Shown in FIG. 2A, assembly line operations may include buffer, or transport, of a plurality of vehicle batteries 205. In this way, it can be appreciated that functions of an assembly line operation may be considered at their most basic level and, therefore, can be easily envisioned as being implemented outside of the context of the automotive vehicle. In an example, however, the plurality of vehicle batteries 205 may be transported along a conveyor 203. Traditionally, this may be the extent of the involvement of the plurality of vehicle batteries 205 at this moment in assembly line operations. However, as in the present disclosure, each vehicle battery 205' of the plurality of vehicle batteries 205 may be concurrently charged. The vehicle battery 205' may be coupled to each of a power receiver 206 and a wireless communication unit 211. The wireless communication unit 211 may transmit, to a power supply control device 285, battery data including battery type of the vehicle battery 205', a linear position of the vehicle battery 205' along the conveyor 203, and an electrical charge of the vehicle battery 205'. To allow for charging of each vehicle battery 205' of the plurality of vehicle batteries 205, the power receiver 206 may be configured to receive power from a power transmitter line 208 via wireless energy transfer 210. The wireless energy transfer 210 may be, in an example, inductive energy transfer.

In an embodiment, the power transmitter line 208 may comprise a plurality of power transmitter line linear sections 209, each of the plurality of power transmitter line linear sections 209 having a linear position along the conveyor 203. Each linear section 209' may be electrically-coupled to a power supply 207 controlled by the power supply control device 285. In an embodiment, each linear section 209' of the power transmitter line 208 may be controlled by the power supply control device 285 and may receive power, from the power supply 207, independently from other ones of the plurality of power transmitter line linear sections 209. This allows the power supply control device 285 to control power provided to each of the plurality of power transmitter line linear sections 209 based on needs of a co-located one of the plurality of vehicle batteries 205 and in view of respective battery data.

FIG. 2A, in particular, demonstrates the ability of the power supply control device 285 to control power supplied to each of plurality of power transmitter line linear sections 209 based on a position of each of the plurality of vehicle batteries 205. For instance, as the conveyor 203 moves the vehicle battery 205', the vehicle battery 205' will be in proximity to, during the course of conveyance, a plurality of the power transmitter line linear sections 209. Accordingly, as the vehicle battery 205' may have different power requirements from other ones of the plurality of vehicle batteries 205, and this power requirement may change over time, having independent control of each of the plurality of the power transmitter line linear sections 209 allows for a consistent and/or controlled power to be supplied to the vehicle battery 205'. This control may be afforded by co-localization of the vehicle battery 205' and the linear section 209' based on linear position data of the vehicle battery 205' and a linear position of the power transmitter line linear section 209'. As in FIG. 2A, it can be appreciated that the vehicle battery 205' and the linear section 209' may be co-located at a first time and, as the vehicle battery 205' is conveyed along the conveyor 203, the vehicle battery 205' may be co-located with a subsequent one of the power transmitter line linear sections 209. In this way, power supplied may be modulated based on a linear position and power requirements of a vehicle battery. Such functionality will be described in detail with reference to subsequent Figures.

While the power transmitter line 208 may include, as illustrated in FIG. 2A, one or more power transmitter line linear sections 209, control of power provided to each of the plurality of vehicle batteries 205 may be alternatively controlled by, in an embodiment, a power receiver controller in communication with the power supply control device 285. Accordingly, FIG. 2B describes a method of the present disclosure wherein wireless power transfer is controlled by a power receiver controller that resides with each BEV battery on a conveyor.

Figure 2B:
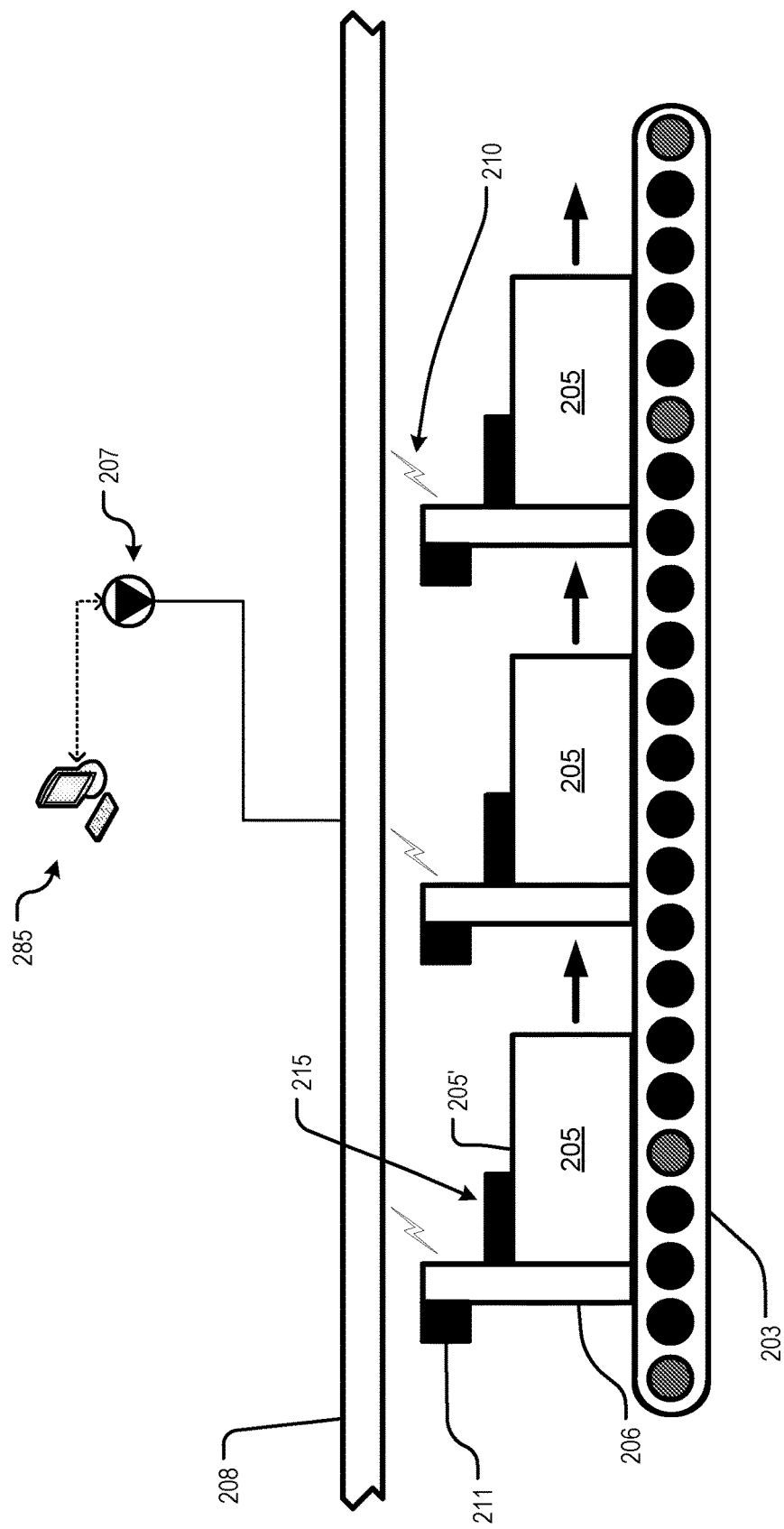
FIG. 2B is a schematic of an assembly line, according to an exemplary embodiment of the present disclosure.

Similarly to FIG. 2A, FIG. 2B illustrates assembly line operations that may include buffer, or transport, of a plurality of vehicle batteries 205. In this way, it can be appreciated that functions of an assembly line operation may be considered at their most basic level and, therefore, can be easily envisioned as being implemented outside of the context of the automotive vehicle. In an example, however, the plurality of vehicle batteries 205 may be transported along a conveyor 203. Traditionally, this may be the extent of the involvement of the plurality of vehicle batteries 205 at this moment in assembly line operations. However, as in the present disclosure, each vehicle battery 205' of the plurality of vehicle batteries 205 may be concurrently charged. The vehicle battery 205' may be coupled to each of a power receiver 206, a power receiver controller 215, and a wireless communication unit 211. The wireless communication unit 211 may transmit, to a power supply control device 285, battery data including battery type of the vehicle battery 205', a linear position of the vehicle battery 205' along the conveyor 203, and an electrical charge of the vehicle battery 205'. To allow for charging of each vehicle battery 205' of the plurality of vehicle batteries 205, the power receiver 206 may be configured to receive power from a power transmitter line 208 via wireless energy transfer 210. The wireless energy transfer 210 may be, in an example, inductive energy transfer. The power transmitter line 208 may be electrically-coupled to a power supply 207 controlled by the power supply control device 285. The power receiver controller 215 may be in electrical communication with the power receiver 206. Moreover, the power receiver controller 215 may be configured to control the power receiver 206 based on input from the power supply control device 285 in view of the information transmitted thereto by the wireless communication unit 211. In other words, in an embodiment, the power supply control device 285 may be in communication with the power receiver controller 215 via the wireless communication unit 211 and may modulate power drawn by each power receiver 206 based on, for instance, a present electrical charge of the vehicle battery 205' evaluated by the power supply control device 285.

Broadly, this allows the power supply control device 285 to control power drawn by each power receiver 206 based on needs of each vehicle battery 205 and in view of respective battery data. In receiving data from each of the plurality of vehicle batteries 205 and providing inputs to each power receiver controller 215 associated therewith, the power supply control device 285 may evaluate power consumption from the power transmitter line 208 in view of a present electrical charge and a charge capacity of each of the plurality of vehicle batteries 205. The evaluation may include a determination of a relative position of each of the plurality of vehicle batteries 205 on the conveyor 203 based on a linear position of each vehicle battery 205 transmitted by the wireless communication unit 211. In an embodiment, the power supply control device 285 may adjust a charge received by each power receiver 206 based on system demand of the power supply 207. For instance, if a vehicle battery 205' is near a maximum capacity of charge, power drawn by the power receiver of the vehicle battery 205' may be reduced, providing additional bandwidth within the system power supply 207 for another of the plurality of vehicle batteries 205 to draw more charge from the power transmitter line 208. Such an implementation of the power supply control device 285 and the power receiver controller 215 will be described with reference to later Figures.

Figure 3A:
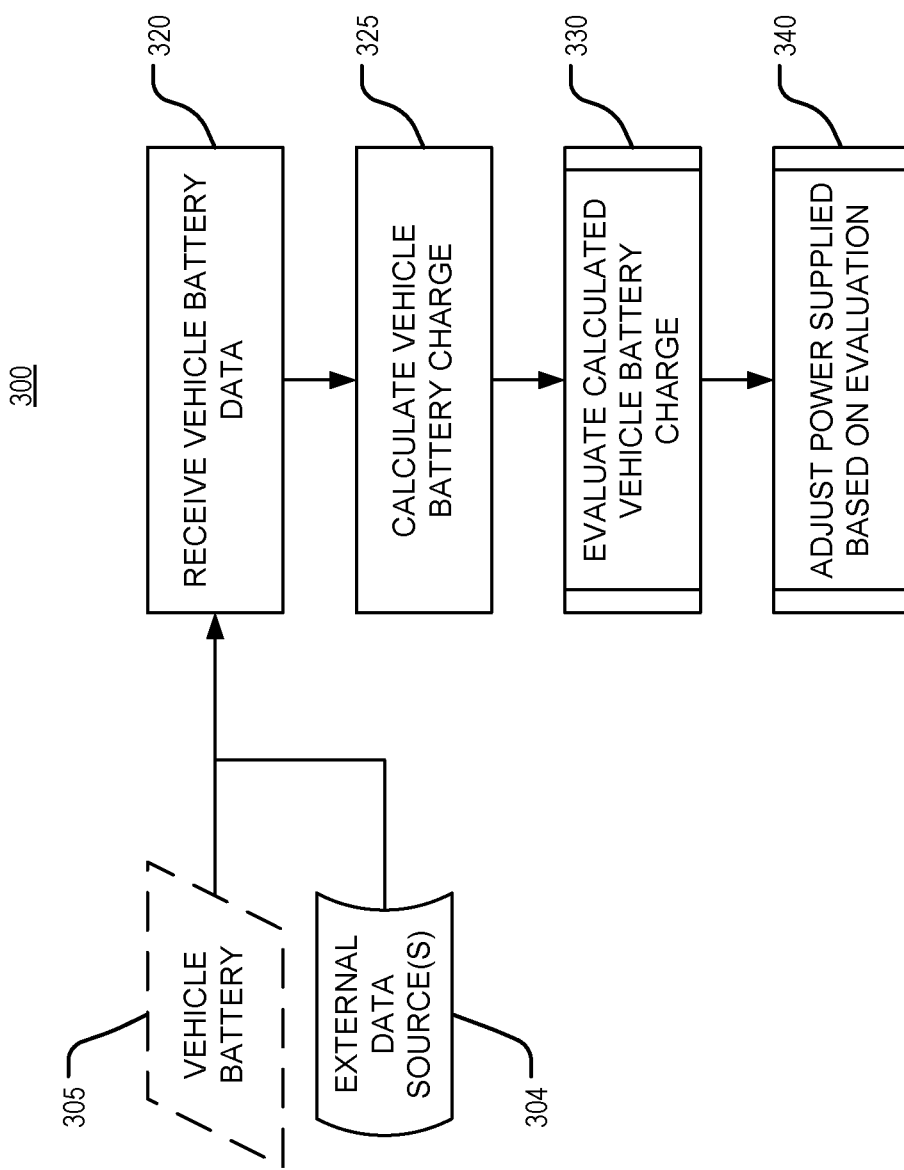
FIG. 3A is a flow diagram of a method for assembly line charging of vehicle batteries, according to an exemplary embodiment of the present disclosure.

The system introduced in FIG. 2A will now be described in detail with reference to FIG. 3A and in view of a single vehicle battery of a plurality of vehicle batteries on a conveyor.

At step 320 of method 300, vehicle battery data may be received. Vehicle battery data may be obtained at step 305 of method 300 from the vehicle battery on the conveyor via wireless communication unit coupled thereto. The vehicle battery data may include a vehicle battery type, a vehicle battery electric charge, and the like. The vehicle battery type may allow for receipt of additional information related to the vehicle battery, such as capacity. The additional information, which may be obtained at step 304 of method 300 from external data source(s), may also include vehicle battery charge parameters including an electric charging rate, a minimum vehicle battery charge, a minimum state of charge, a maximum vehicle battery charge, and a maximum state of charge, among others. The minimum vehicle battery charge may be, in an example, a minimum voltage required in order to perform a vehicle performance evaluation. Similarly, the minimum state of charge may be, in an example, a minimum relative charge required in order to perform a vehicle performance evaluation. The maximum vehicle battery charge may be, in an example, a maximum voltage that is allowed during vehicle battery transport. Similarly, the maximum state of charge may be, in an example, a maximum relative charge that is allowed during vehicle battery transport. It can be appreciated that the minimum vehicle battery charge, the maximum vehicle battery charge, the minimum state of charge, and the maximum state of charge are not reflective of an inherent capacity of the vehicle battery but are, instead, intended to serve as thresholds.

At step 325 of method 300, based on the obtained vehicle battery electric charge, a vehicle battery charge may be calculated. The calculated vehicle battery charge may be, for instance, a state of charge (SoC). The SoC, or level of charge of an electric battery relative to its capacity, may be estimated according to a known discharge curve, as in the case of a voltage method, or according to "coulomb counting", which calculates the SoC by measuring the battery current and integrating it in time. The estimated SoC can be based on, in part, the obtained vehicle battery data from step 320 of method 100.

At sub process 330 of method 300, and in view of the vehicle battery charge parameters obtained at step 320 of method 300, the calculated vehicle battery charge may be evaluated. The evaluation may include a comparison of the calculated vehicle battery charge to one or more corresponding vehicle battery charge parameters. For instance, the evaluation may include a comparison of the calculated vehicle battery charge, which may be a voltage, to a corresponding maximum vehicle battery charge. Sub process 330 of method 300 will be described in detail with reference to subsequent Figures.

Accordingly, at sub process 340 of method 300, the evaluated calculated vehicle battery charge may be used to adjust a power supplied to a corresponding linear section of a power transmitter line. For instance, with reference to the above example, if it were determined that the calculated vehicle battery charge was nearing the corresponding maximum vehicle battery charge for the vehicle battery, the power supplied to the corresponding linear section of the power transmitter line may be reduced to ensure the vehicle battery charge does not exceed the corresponding maximum vehicle battery charge.

Figure 3B:
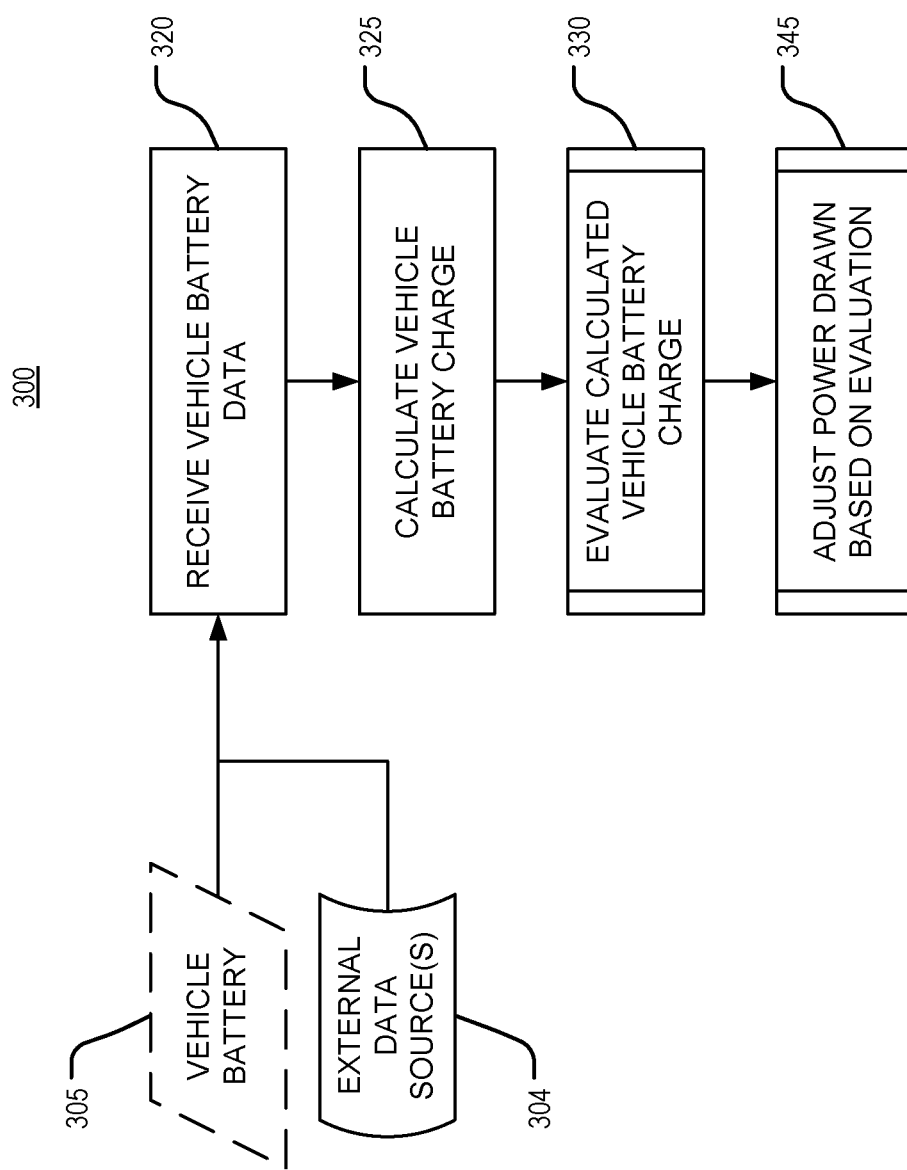
FIG. 3B is a flow diagram of a method for assembly line charging of vehicle batteries, according to an exemplary embodiment of the present disclosure.

The system introduced in FIG. 2B will now be described in detail with reference to FIG. 3B and in view of a single vehicle battery of a plurality of vehicle batteries on a conveyor.

At step 320 of method 300, vehicle battery data may be received. Vehicle battery data may be obtained at step 305 of method 300 from the vehicle battery on the conveyor via wireless communication unit coupled thereto. The vehicle battery data may include a vehicle battery type, a vehicle battery electric charge, and the like. The vehicle battery type may allow for receipt of additional information related to the vehicle battery, such as capacity. The additional information, which may be obtained at step 304 of method 300 from external data source(s), may also include vehicle battery charge parameters including an electric charging rate, a minimum vehicle battery charge, a minimum state of charge, a maximum vehicle battery charge, and a maximum state of charge, among others. The minimum vehicle battery charge may be, in an example, a minimum voltage required in order to perform a vehicle performance evaluation. Similarly, the minimum state of charge may be, in an example, a minimum relative charge required in order to perform a vehicle performance evaluation. The maximum vehicle battery charge may be, in an example, a maximum voltage that is allowed during vehicle battery transport. Similarly, the maximum state of charge may be, in an example, a maximum relative charge that is allowed during vehicle battery transport. It can be appreciated that the minimum vehicle battery charge, the maximum vehicle battery charge, the minimum state of charge, and the maximum state of charge are not reflective of an inherent capacity of the vehicle battery but are, instead, intended to serve as thresholds.

At step 325 of method 300, based on the obtained vehicle battery electric charge, a vehicle battery charge may be calculated. The calculated vehicle battery charge may be, for instance, a state of charge (SoC). The SoC, or level of charge of an electric battery relative to its capacity, may be estimated according to a known discharge curve, as in the case of a voltage method, or according to "coulomb counting", which calculates the SoC by measuring the battery current and integrating it in time. The estimated SoC can be based on, in part, the obtained vehicle battery data from step 320 of method 100.

At sub process 330 of method 300, and in view of the vehicle battery charge parameters obtained at step 320 of method 300, the calculated vehicle battery charge may be evaluated. The evaluation may include a comparison of the calculated vehicle battery charge to one or more corresponding vehicle battery charge parameters. For instance, the evaluation may include a comparison of the calculated vehicle battery charge, which may be a voltage, to a corresponding maximum vehicle battery charge. Sub process 330 of method 300 will be described in detail with reference to subsequent Figures.

Accordingly, at sub process 345 of method 300, the evaluated calculated vehicle battery charge may be used to adjust a power drawn by a power receiver of the vehicle battery. For instance, with reference to the above example, if it were determined that the calculated vehicle battery charge was nearing the corresponding maximum vehicle battery charge for the vehicle battery, the power drawn by the power receiver and from the power transmitter line may be reduced, by the power receiver controller, to ensure the vehicle battery charge does not exceed the corresponding maximum vehicle battery charge.

Figure 4A:
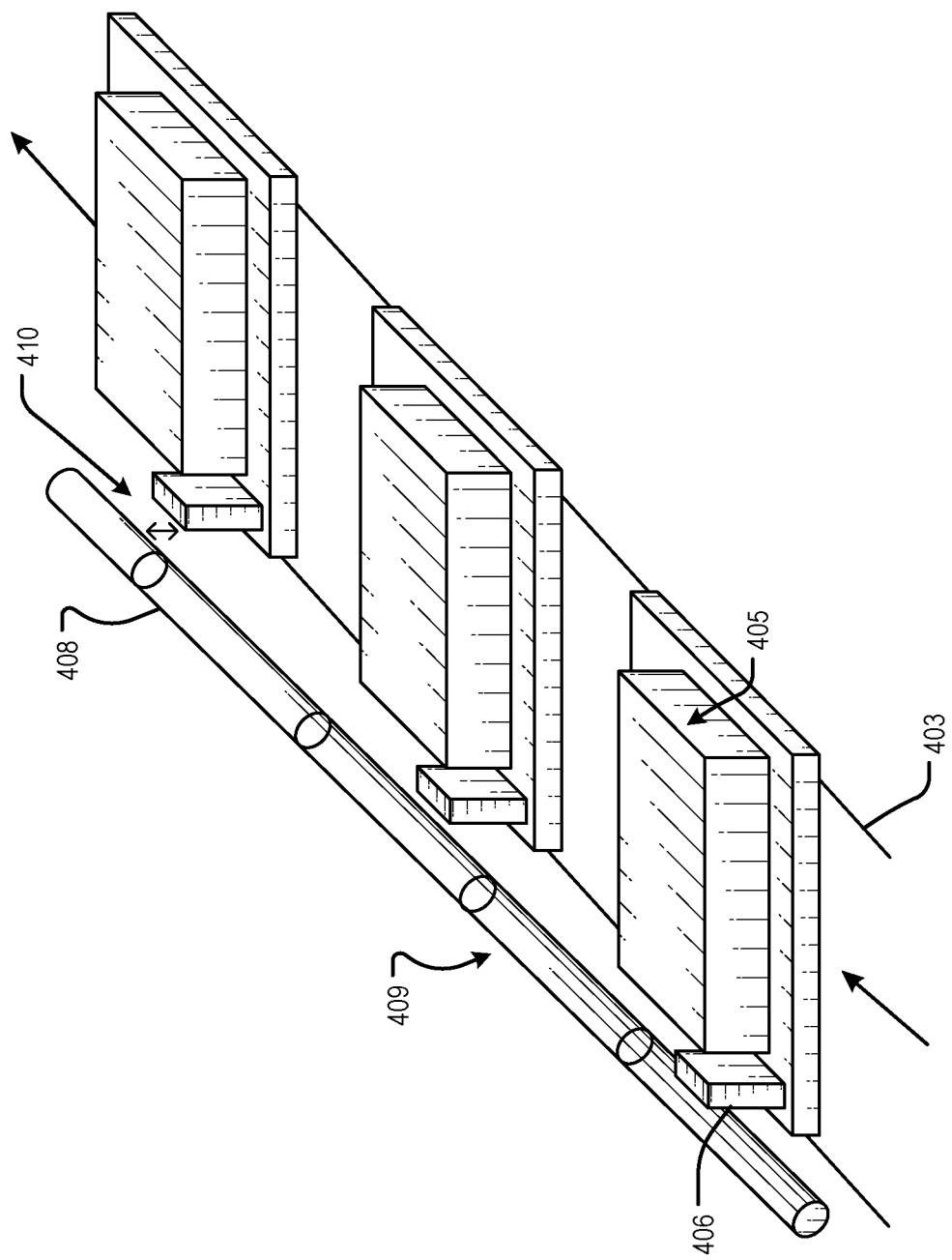
FIG. 4A is an illustration of an assembly line for conveyance of vehicle batteries, according to an exemplary embodiment of the present disclosure.

FIG. 4A is an illustration of a plurality of vehicle batteries 405 in buffer within an assembly line. The plurality of vehicle batteries 405 are on a conveyor 403 and receiving power from a power transmitter line 408 via power transmitter line linear section 409 and power receiver 406. The plurality of vehicle batteries 405 may receive power via wireless energy transfer 410 by inductive means. The buffer, as can be appreciated, may be a moment in production when the objective is to move, for example, a vehicle battery from one position in the assembly line to another position in the assembly line. The present disclosure allows the buffer to be a vehicle battery charging phase and maximize down time.

Figure 4B:
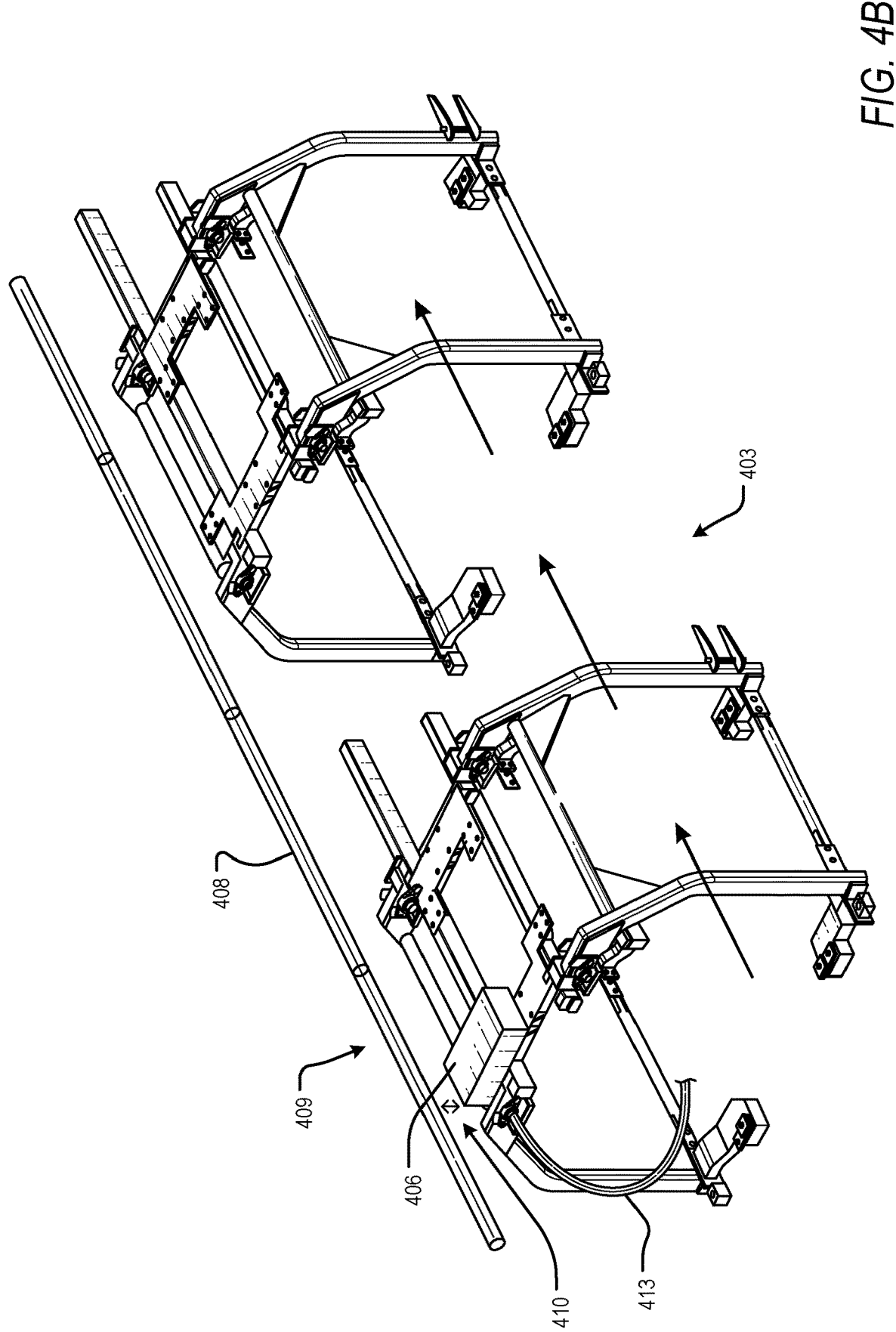
FIG. 4B is an illustration of an assembly line for conveyance of vehicle battery-containing vehicle components, according to an exemplary embodiment of the present disclosure.

FIG. 4B is an illustration of a carriage configured to transport a plurality of vehicle batteries installed within an electric vehicle during assembly on an assembly line. The plurality of vehicle batteries are receiving power from a power transmitter line 408 via power transmitter line linear section 409 and power receiver 406. The plurality of vehicle batteries may receive power via wireless energy transfer 410 by inductive means via the power receiver 406 and a charging cable 413, the charging cable 413 connecting the power receiver 406 to the vehicle battery of the electric vehicle. Though not shown to allow for clarity of other components, it can be appreciated that the charging cable 413 terminates into a standard charging port of the electric vehicle, wherein connection to the vehicle battery is made. As can be appreciated, the illustration demonstrates vehicle battery charging during movement of the electric vehicle from one position to another position within the assembly line. In addition, the system illustrated in FIG. 4B allows the vehicle battery to be charged therebetween, thereby maximizing down time.

Introduced in FIG. 3A, sub process 340 of method 300, and variations thereof, will now be described in detail with reference to FIG. 5 through FIG. 8. Though sub process 340 of method 300 will be the focus of subsequent discussion, it can be appreciated that, nearly interchangeably, sub process 345 of method 300, introduced in FIG. 3B, may be similarly implemented without deviating from the spirit of the invention. In fact, each of FIG. 5 through FIG. 8 may be considered, in the alternative, in context of the exemplary power control system of FIG. 3B.

Figure 5:
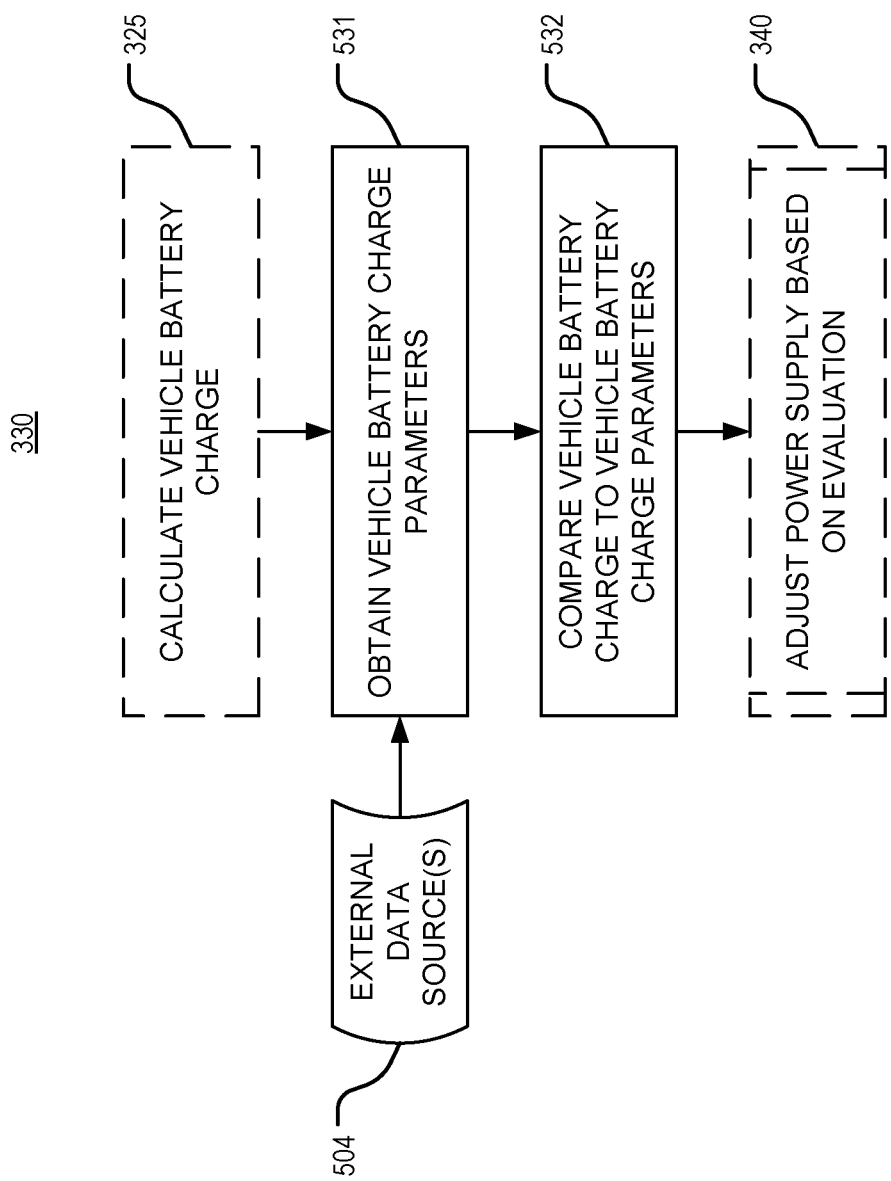
FIG. 5 is a flow diagram of a sub process of a method for assembly line charging of vehicle batteries, according to an exemplary embodiment of the present disclosure.

Turning now to FIG. 5, a detailed description of sub process 330 of method 300 will be described.

At step 531 of sub process 330, a vehicle battery charge calculated at step 325 of method 300 and vehicle battery charge parameters acquired at step 504 of sub process 330, acquired from external data source(s), may be obtained.

At step 532 of sub process 330, the calculated vehicle battery charge may be compared with the obtained vehicle battery charge parameters. The vehicle battery charge parameters may be based on battery data previously acquired during method 300. For instance, the vehicle battery charge parameters may include a maximum SoC corresponding to battery ABC, battery ABC being identified by battery type data within the battery data. It can be appreciated that different battery types will, by design, have different properties and, as an example, capacities. In an embodiment, and as in FIG. 5, the maximum SoC of battery ABC is a maximum SoC allowed prior to vehicle battery shipment at the end of the assembly line. Thus, at step 532 of sub process 330, a comparison may be performed to compare the calculated vehicle battery charge to the maximum SoC to determine if charging of the vehicle battery should be modified. To this end, the calculated vehicle battery charge may be transformed into a SoC by conversion via discharge curve, the discharge curve acquired at step 504 of sub process 330 being specific to the battery type obtained during method 300.

At sub process 340 of method 300, the power supplied to a corresponding power transmitter line linear section may be modulated based on the comparison at step 532 of sub process 330. In an example, if it is determined that the SoC of the vehicle battery is near the maximum SoC acquired at step 504 of sub process 330, a power supply control unit may decrease power supplied to the corresponding power transmitter line linear section in order to prevent the SoC of the vehicle battery from surpassing the maximum SoC allowed prior to shipment of the vehicle battery at the end of the assembly line.

Figure 6A:
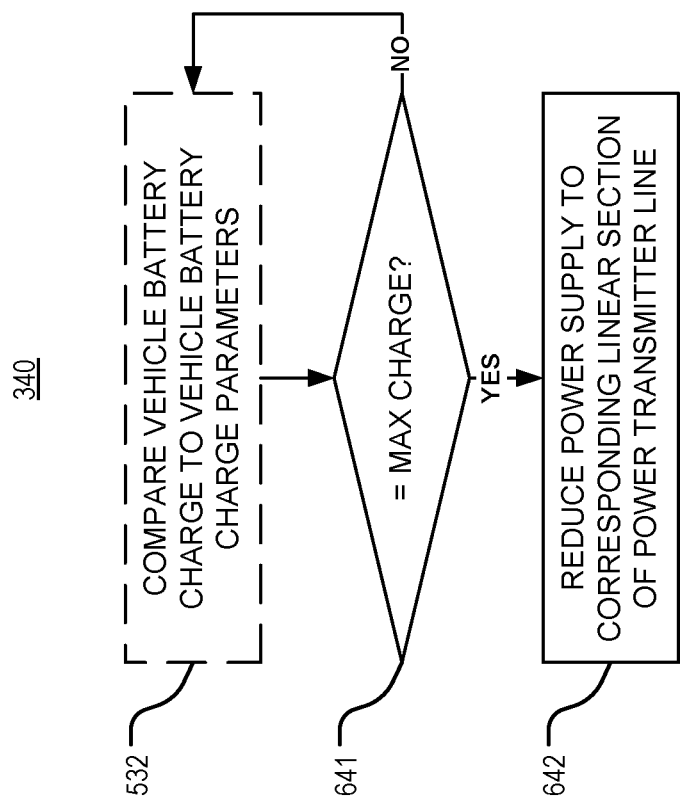
FIG. 6A is a flow diagram of a sub process of a method for assembly line charging of vehicle batteries, according to an exemplary embodiment of the present disclosure.
Figure 6B:
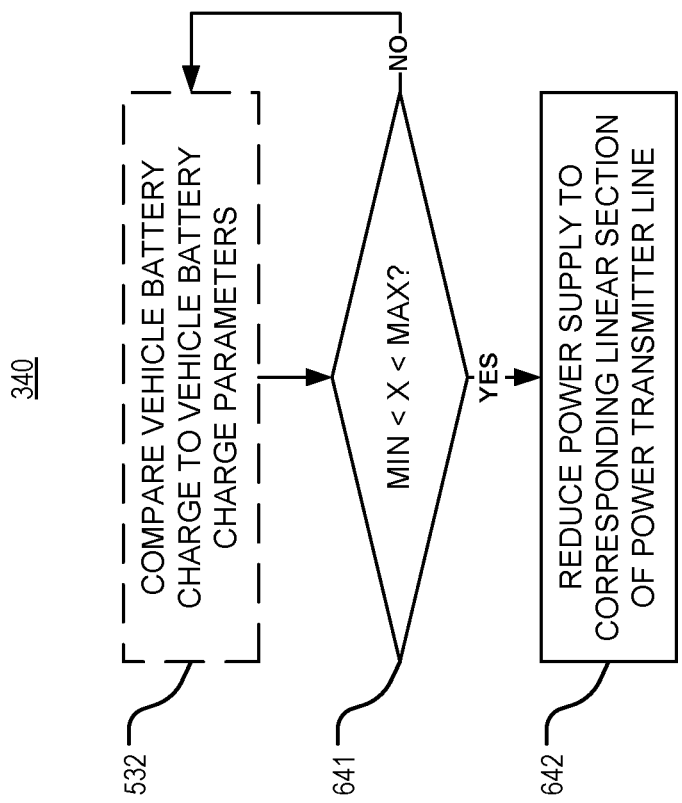
FIG. 6B is a flow diagram of a sub process of a method for assembly line charging of vehicle batteries, according to an exemplary embodiment of the present disclosure.

Regarding sub process 340 of method 300, FIG. 6A and FIG. 6B provide exemplary embodiments thereof.

FIG. 6A provides a description of an implementation of sub process 340 of method 300, wherein a vehicle battery charge is evaluated in view a maximum vehicle battery charge and power is modulated, accordingly. This simplistic example provides further description of that which has been introduced above.

At step 641 of sub process 340, the comparison of step 532 of sub process 330 can be evaluated to determine if a calculated vehicle battery charge of a vehicle battery, for example, is near a corresponding maximum vehicle battery charge. The corresponding maximum vehicle battery charge may define a maximum vehicle battery charge allowed prior to transport of the vehicle battery to an end user. The corresponding maximum vehicle battery charge may be specific to a battery type of the vehicle battery, the battery type being obtained at step 320 of method 300. If it is determined at step 641 of sub process 340 that the calculated vehicle battery charge is not near the corresponding maximum vehicle battery charge of the vehicle battery, no adjustments are made to a power supply to a corresponding power transmitter line linear section associated with the vehicle battery and the vehicle battery is allowed to continue to charge at a maximal rate.

If it is determined, however, at step 641 of sub process 340, that the calculated vehicle battery charge is near the corresponding maximum vehicle battery charge of the vehicle battery, the power supplied to the vehicle battery may be adjusted at step 642 of sub process 340. The adjustment at step 642 of sub process 340 may be a reduction in the power supplied to the corresponding power transmitter line linear section associated with the vehicle battery. In this way, minimal to no power supply may be provided to the vehicle battery such that system-wide power bandwidth may be efficiently distributed and the vehicle battery charge does not exceed the corresponding maximum vehicle battery charge acceptable for transport.

FIG. 6B provides a description of an implementation of sub process 340 of method 300, wherein a vehicle battery charge is evaluated in view a vehicle battery charge range and power is modulated, accordingly.

At step 641 of sub process 340, the comparison of step 532 of sub process 330 can be evaluated to determine if a SoC, for example, of a vehicle battery charge is within a corresponding vehicle battery charge range. The corresponding vehicle battery charge range may define, at a lower end of the range (e.g., minimum), a minimum SoC required for performing a vehicle performance evaluation, and, at a higher end of the range (e.g., maximum), a maximum SoC allowed prior to transport of the vehicle battery to an end user. The minimum SoC and the maximum SoC may be specific to a battery type of the vehicle battery, the battery type being obtained at step 320 of method 300.

If it is determined at step 641 of sub process 340 that the SoC of the vehicle battery charge is outside the corresponding vehicle battery charge range, no adjustments are made to a power supply to a corresponding power transmitter line linear section and the vehicle battery is allowed to continue to charge at a maximal rate. It can be assumed that, appreciating step 641 of sub process 340 is performed iteratively and for each one of a plurality of vehicle batteries, it is unlikely for a SoC of a vehicle battery charge to be higher than the maximum SoC and, thus, the opposite result is the focus herein.

If it is determined, however, at step 641 of sub process 340, that the SoC of the vehicle battery charge is between the minimum and the maximum, which may deemed an acceptable SoC, the power supplied to the vehicle battery may be adjusted at step 642 of sub process 340. The adjustment at step 642 of sub process 340 may be a reduction in the power supplied to the corresponding power transmitter line linear section. In this way, the vehicle battery may still continue charging, in view of the maximum, but with minimal power supply such that system-wide power bandwidth may be efficiently distributed. In other words, step 642 of sub process 340, as described in FIG. 6B, allows for a power optimization method to be implemented within the assembly line. Power optimization, as introduced herein, will be described in more detail with reference to FIG. 7.

Figure 7:
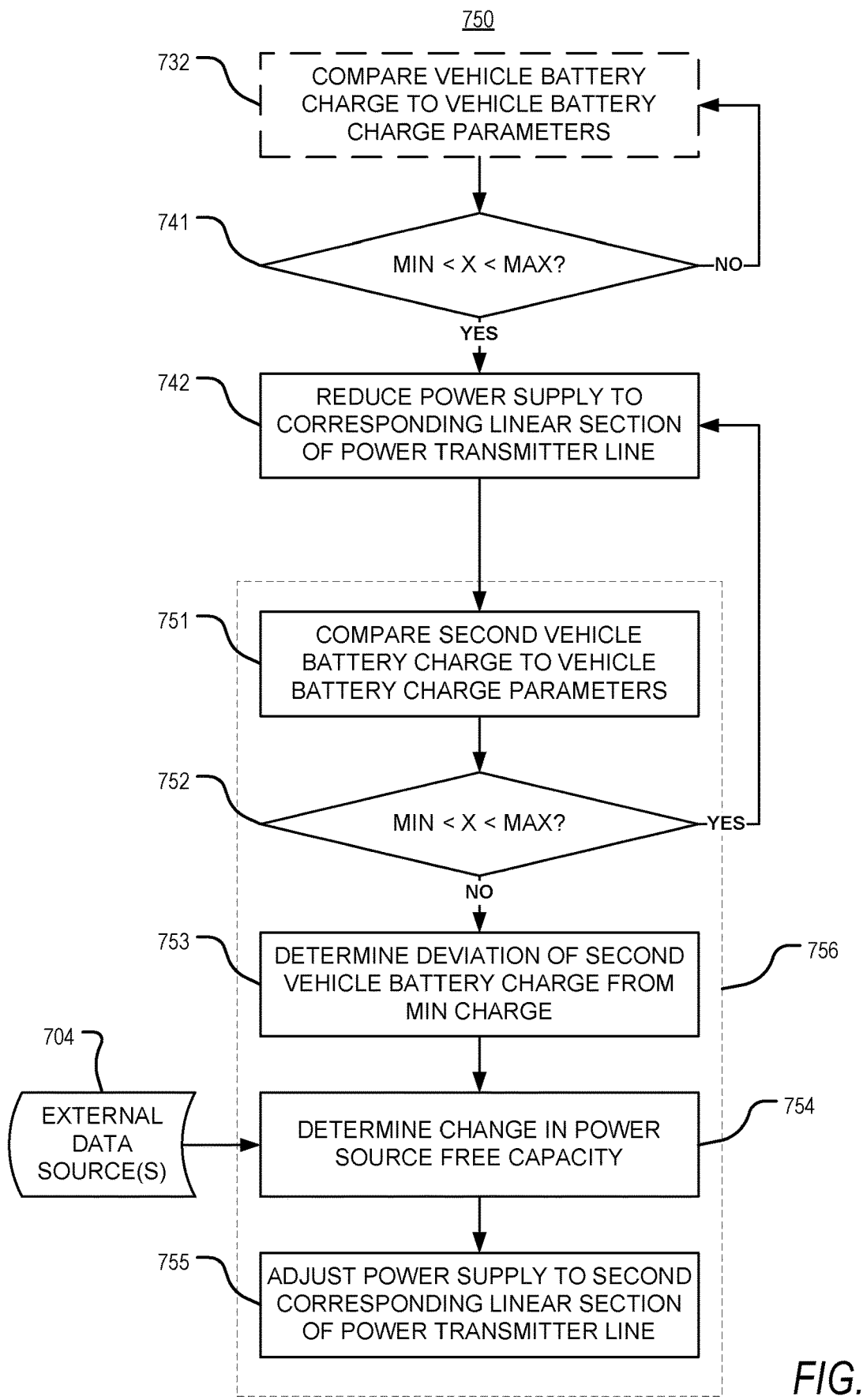
FIG. 7 is a flow diagram of a sub processes of a method for assembly line charging of vehicle batteries, according to an exemplary embodiment of the present disclosure.

FIG. 7 provides a description of an implementation of sub process 340 of method 300, wherein a vehicle battery charge is evaluated in view a vehicle battery charge range and power is modulated, accordingly. Moreover, FIG. 7 integrates a system-wide approach, wherein a system power capacity is considered in view of individual power demands of each of the plurality of vehicle batteries.

At step 741 of method 750, the comparison of step 732 of sub process 330 can be evaluated to determine if a SoC, for example, of a vehicle battery charge of a first vehicle battery is within a corresponding vehicle battery charge range of the first vehicle battery. The corresponding vehicle battery charge range may define, at a lower end of the range (e.g., minimum), a minimum SoC required for performing a vehicle performance evaluation, and, at a higher end of the range (e.g., maximum), a maximum SoC allowed prior to transport of the first vehicle battery to an end user. The minimum SoC and the maximum SoC may be specific to a battery type of the first vehicle battery, the battery type being obtained at step 320 of method 300.

If it is determined at step 741 of method 750 that the SoC of the vehicle battery charge is outside the corresponding vehicle battery charge range, no adjustments are made to a power supply to a corresponding power transmitter line linear section associated with the first vehicle battery and the first vehicle battery is allowed to continue to charge at a maximal rate. It can be assumed that, appreciating step 741 of method 750 is performed iteratively, it is unlikely for a SoC of a vehicle battery charge to be higher than the maximum SoC and, thus, the opposite result is the focus herein.

If it is determined, however, at step 741 of method 750, that the SoC of the vehicle battery charge is between the minimum and the maximum, which may deemed an acceptable SoC of the first vehicle battery, the power supplied to the first vehicle battery may be adjusted at step 742 of method 750 in view of the embodiments of FIG. 6A. The adjustment at step 742 of method 750 may be a reduction in the power supplied to the corresponding power transmitter line linear section associated with the first vehicle battery. In this way, the first vehicle battery may still continue charging, in view of the maximum, but with minimal power supply such that system-wide power bandwidth may be efficiently distributed. In other words, step 742 of method 750 allows for a power optimization method to be implemented within the assembly line.

To this end, when it is determined that the first vehicle battery has achieved an acceptable SoC, method 750 may proceed to step 751 to begin power redistribution. At step 751 of method 750, a calculated vehicle battery charge of a second vehicle battery may be compared to corresponding vehicle battery charge parameters obtained at step 531 of method 330. The corresponding vehicle battery charge parameters may be based on battery data previously acquired during method 300. For instance, the corresponding vehicle battery charge parameters may include a maximum SoC corresponding to the second vehicle battery. In the present example, the corresponding vehicle battery charge parameters may include a corresponding vehicle battery charge range of the second vehicle battery, the corresponding vehicle battery charge range defining, at a lower end of the range (e.g., minimum), a minimum SoC required for performing a vehicle performance evaluation, and, at a higher end of the range (e.g., maximum), a maximum SoC allowed prior to transport of the second vehicle battery to an end user. The minimum SoC and the maximum SoC may be specific to a battery type of the second vehicle battery, the battery type being obtained at step 320 of method 300.

At step 752 of method 750, the comparison of the second vehicle battery charge and the corresponding vehicle battery charge range can be evaluated to determine if the SoC, for example, of the vehicle battery charge is between the minimum SoC and the maximum SoC of the second vehicle battery.

If it is determined at step 752 of method 750 that the SoC of the vehicle battery charge is between the minimum and the maximum, which may deemed an acceptable SoC of the second vehicle battery, the power supplied to the second vehicle battery may be adjusted at step 742 of method 750 in view of the embodiments of FIG. 6A. The adjustment at step 742 of method 750 may be a reduction in the power supplied to the corresponding power transmitter line linear section associated with the second vehicle battery. In this way, the second vehicle battery may still continue charging, in view of the maximum, but with minimal power supply such that system-wide power bandwidth may be efficiently distributed.

To this end, if it is determined at step 752 of method 750 that the SoC of the vehicle battery charge is outside the corresponding vehicle battery charge range of the second vehicle battery, the SoC of the vehicle battery charge is determined to be low and compensatory action may needed, particularly if a linear position of the second vehicle battery is near an end of the assembly line.

Accordingly, at step 753 of method 750, a deviation of the SoC of the vehicle battery charge of the second vehicle battery relative to a minimum SoC may be determined. The deviation may be defined as a percentage and may be used to allocate power resources. For instance, as it relates to the second vehicle battery, a first power increase may be applied, when bandwidth permits, if a magnitude of the SoC deviates from the minimum SoC by 5%. If the magnitude of the SoC deviates from the minimum SoC by 10%, a second power increase may applied, in addition to the first power increase and when bandwidth permits.

As indicated, additional power may only be supplied when available in view of system-wide power bandwidth. At step 754 of method 750, and in view of power reductions at step 742 of method 750, system-wide power bandwidth may be determined from external data acquired at step 704 of method 750. Therefore, based on the system-wide power bandwidth availability determined at step 754 of method 750, adjustments may be made to power supplied to power transmitter line linear sections associated with the second vehicle battery at step 755 of method 750.

It should be appreciated that steps 751 through 755 may be classified as an iterative loop 756 and may be continuously performed in view of system-wide power bandwidth and a number of vehicle batteries within the system.

It can be further appreciated that the power optimization method (method 750) can be configured to consider a linear position of each of the plurality of vehicle batteries relative to a beginning of a conveyor, and an end of the conveyor, in an example. In this way, power supply can be prioritized to vehicle batteries nearing the end of the conveyor, as needed.

Figure 8:
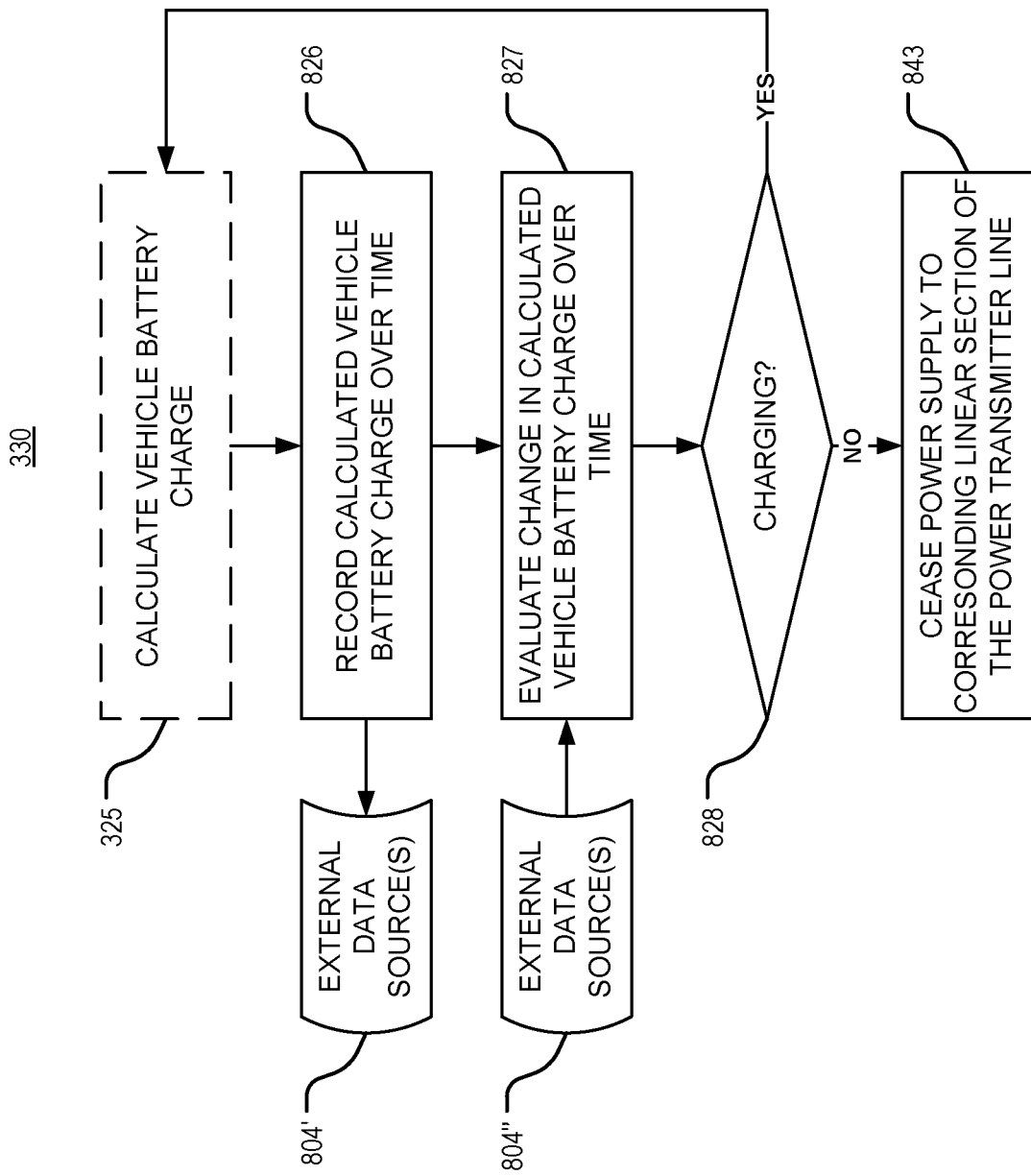
FIG. 8 is a flow diagram of a sub process of a method for assembly line charging of vehicle batteries, according to an exemplary embodiment of the present disclosure.

FIG. 8 provides a description of an implementation of sub process 330 of method 300, wherein a vehicle battery charge is evaluated over time to determine a viability of the vehicle battery. In this way, defective vehicle batteries may be removed from the conveyor in real time, thereby reducing inefficiencies.

At step 826 of sub process 330, vehicle battery charges, of a single vehicle battery, calculated at step 325 of sub process 330 may be recorded for a predetermined time period. The predetermined time period may be 5 seconds, 30 seconds, 2 minutes, or similar time horizon to allow for certainty. The calculated vehicle battery charges may be recorded within external data source(s) at step 804' of sub process 330.

At step 827 of sub process 330, the recorded time series of calculated vehicle battery charges may be acquired at step 804" of sub process 330 and evaluated. The evaluation may include a determination of a significant change in vehicle battery charge over the time period of the recorded time series. The significant change may be a change in vehicle battery charge of 2.5%, 5%, 7.5%, or similar charge threshold that may indicate whether charging of the vehicle battery is occurring.

If it is determined at step 828 of sub process 330 that a significant change in vehicle battery charge has occurred during the recorded time series, sub process 330 returns to step 325 and vehicle battery charges are calculated anew. In another embodiment, a positive determination at step 828 of sub process 330 may end sub process 330.

However, if it is determined at step 828 of sub process 330 that a significant change in vehicle battery charge has not occurred during the recorded time series, sub process 330 moves to step 843 and power supplied to a corresponding power transmitter line linear section is ceased. In this way, power supplied to the defective battery may be redistributed to other charging ones of a plurality of vehicle batteries. Moreover, when it is determined that a particular vehicle battery is not charging, or is defective, an alert may be provided to a system operator, thereby allowing for countermeasures to be implemented in order to minimize inefficiencies.

Figure 9:
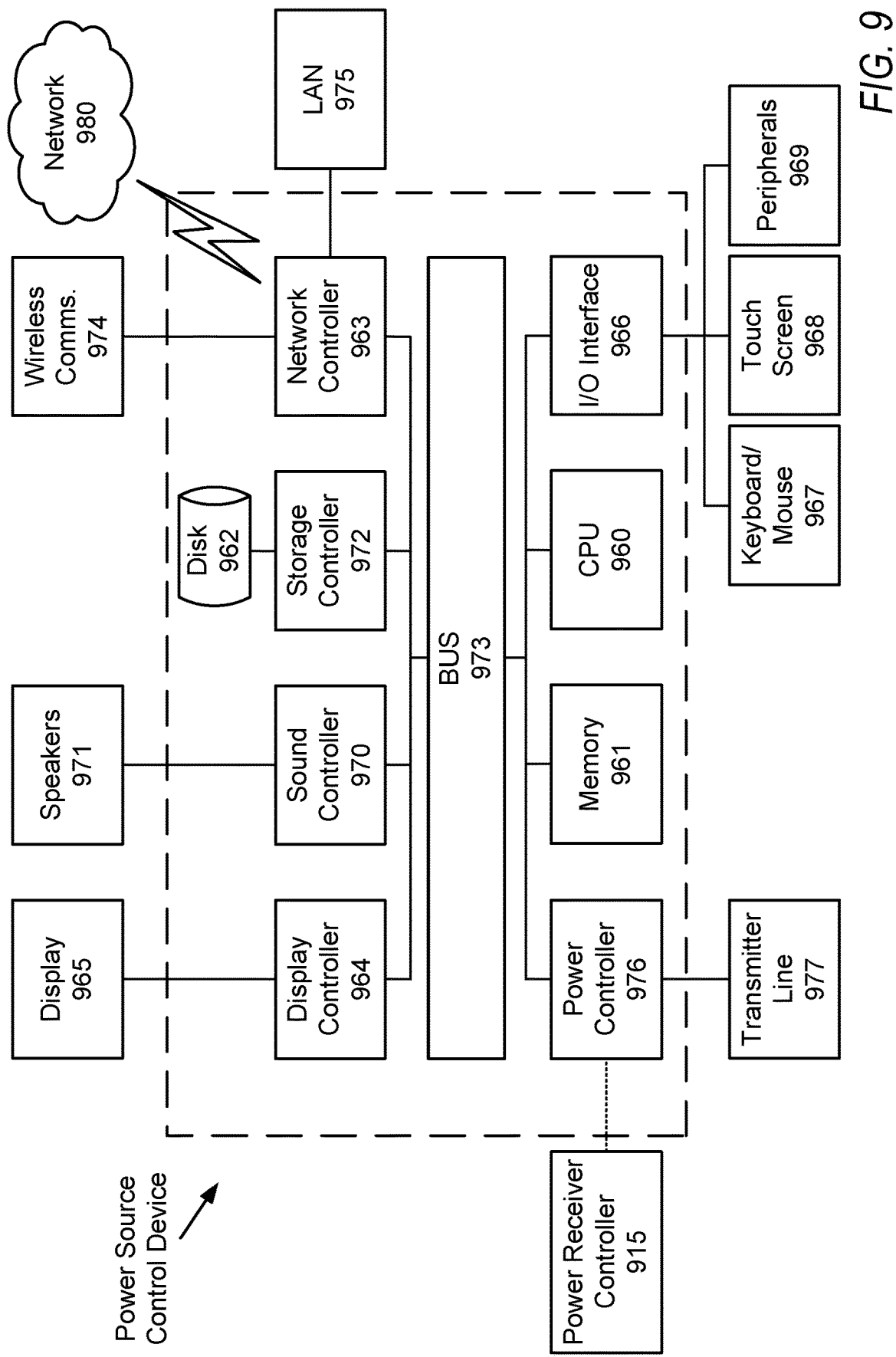
FIG. 9 is a hardware description of a power source control device of a method for assembly line charging of vehicle batteries, according to an exemplary embodiment of the present disclosure.

Next, a hardware description of the power source control device according to exemplary embodiments is described with reference to FIG. 9. In FIG. 9, the power source control device includes a CPU 960 which performs the processes described above/below. The process data and instructions may be stored in memory 961. These processes and instructions may also be stored on a storage medium disk 962 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the power source control device communicates, such as a server or computer.

Further, the claimed advancements may be provided as a utility application, background daemon, or component of an operating system, or combination thereof, executing in conjunction with CPU 960 and an operating system such as Microsoft Windows 7, UNIX, Solaris, LINUX, Apple MAC-OS and other systems known to those skilled in the art.

The hardware elements in order to achieve the power source control device may be realized by various circuitry elements, known to those skilled in the art. For example, CPU 960 may be a Xenon or Core processor from Intel of America or an Opteron processor from AMD of America, or may be other processor types that would be recognized by one of ordinary skill in the art. Alternatively, the CPU 960 may be implemented on an FPGA, ASIC, PLD or using discrete logic circuits, as one of ordinary skill in the art would recognize. Further, CPU 960 may be implemented as multiple processors cooperatively working in parallel to perform the instructions of the inventive processes described above.

The power source control device in FIG. 9 also includes a network controller 963, such as an Intel Ethernet PRO network interface card from Intel Corporation of America, for interfacing with network 980. As can be appreciated, the network 980 can be a public network, such as the Internet, or a private network such as an LAN or WAN network, or any combination thereof and can also include PSTN or ISDN sub-networks. The network 980 can also be wired, such as an Ethernet network, or can be wireless such as a cellular network including EDGE, 3G and 4G wireless cellular systems. The wireless network can also be WiFi, Bluetooth, or any other wireless form of communication that is known. In an embodiment, the private network may local area network 975.

The power source control device in may also include a power controller 976. The power controller 976 may deployed by CPU 960 and configured to control power distribution to a power transmitter line 977 within a system. Further, the power controller 976 may be configured to communicate with a power receiver controller 915 of a vehicle battery to adjust power draw from the power transmitter line 977. As described above, the power transmitter line 977 may comprise a plurality of power transmitter line linear sections. The power controller 976 may perform the power optimization method of FIG. 7 to supply power, via the power transmitter line 977, to power transmitter line linear sections associated with particular vehicle batteries, or to instruct power draw, via the power receiver controller 915, from the power transmitter line 977 for each vehicle battery.

The power source control device further includes a display controller 964, such as a NVIDIA GeForce GTX or Quadro graphics adaptor from NVIDIA Corporation of America for interfacing with display 965, such as a Hewlett Packard HPL2445w LCD monitor. A general purpose I/O interface 966 interfaces with a keyboard and/or mouse 967 as well as a touch screen panel 968 on or separate from display 965. General purpose I/O interface also connects to a variety of peripherals 969 including printers and scanners, such as an OfficeJet or DeskJet from Hewlett Packard.

A sound controller X20 is also provided in the power source control device, such as Sound Blaster X-Fi Titanium from Creative, to interface with speakers/microphone 971 thereby providing sounds and/or music.

The general purpose storage controller 972 connects the storage medium disk 962 with communication bus 973, which may be an ISA, EISA, VESA, PCI, or similar, for interconnecting all of the components of the power source control device. A description of the general features and functionality of the display 965, keyboard and/or mouse 967, as well as the display controller 964, storage controller 972, network controller 963, sound controller 970, and general purpose I/O interface 966 is omitted herein for brevity as these features are known.

Figure 10:
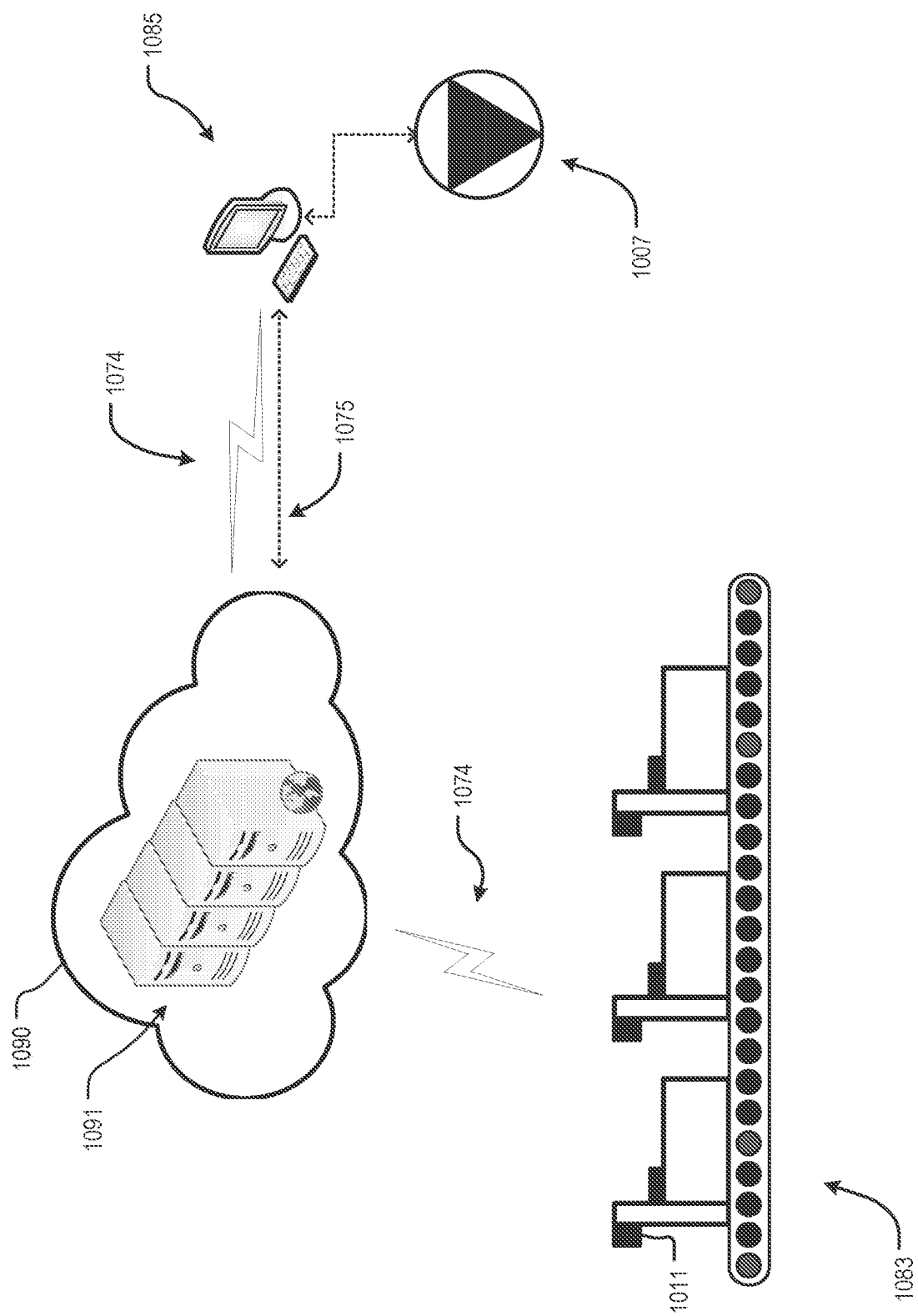
FIG. 10 is a schematic of communication between an assembly line and a power source control device, according to an exemplary embodiment of the present disclosure.

FIG. 10 reiterates FIG. 2A and FIG. 2B and provides a high-level schematic of an exemplary communication system of a system employing the above-described methods. A wireless communication unit 1011 may be coupled to each of a plurality of vehicle batteries of a conveyor system 1083. The wireless communication unit 1011 may be in wireless communication 1074 with a cloud computing environment 1090 including a server 1091. In an example, the cloud computing environment 1090 may be a manufacturing quality control environment for monitoring data transmitted from each wireless communication unit 1011 within a manufacturing center. For instance, the wireless communication unit 1011 may transmit vehicle battery data including vehicle battery type and vehicle battery electric charge to a power supply control device 1085 via wireless communication 1074 and/or local area network connection 1075 and the cloud computing environment 1090. In an example, the vehicle battery data may further include vehicle battery warranty information, potential vehicle battery recall information, and the like.

In an embodiment, the power supply control device 1085 may be in controlling communication with a power source 1007 such that vehicle battery data may accounted for during power allocation to the plurality of vehicle batteries within the conveyor system 1083 and performance of the methods described herein.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) An apparatus for assembly line charging of vehicle batteries, the apparatus comprising processing circuitry configured to receive battery data of a plurality of vehicle batteries on an assembly line, the received battery data including electric charge data of each vehicle battery of the plurality of vehicle batteries, each of the plurality of vehicle batteries being powered by a corresponding linear section of a stationary power transmitter line, calculate a vehicle battery charge of each of the plurality of vehicle batteries based on the received electric charge data of each vehicle battery, evaluate the calculated vehicle battery charge of each of the plurality of vehicle batteries relative to associated vehicle battery charge parameters, the vehicle battery charge parameters including a minimum vehicle battery charge and a maximum vehicle battery charge of each of the plurality of vehicle batteries, and adjust a power supplied to the corresponding linear section of the stationary power transmitter line based on the evaluation of the calculated vehicle battery charge of each of the plurality of vehicle batteries, wherein the adjusted power supplied to the corresponding linear section of the stationary power transmitter line is adjusted to optimize power distribution amongst linear sections of the stationary power transmitter line based on the evaluated vehicle battery charge of each of the plurality of vehicle batteries.

(2) The apparatus according to (1), wherein the processing circuitry is further configured to adjust the power supplied to the corresponding linear section of the stationary power transmitter line by, when an evaluated vehicle battery charge of one of the plurality of vehicle batteries indicates an associated maximum vehicle battery charge is achieved, decreasing power supplied to the corresponding linear section.

(3) The apparatus according to either (1) or (2), wherein the processing circuitry is further configured to supply power to a linear section of the stationary power transmitter line based on a co-localization of one of the plurality of vehicle batteries with the linear section.

(4) The apparatus according to any one of (1) to (3), wherein the received battery data includes a type of each of the plurality of vehicle batteries, the corresponding vehicle battery charge parameters being based on the type of each of the plurality of vehicle batteries.

(5) The apparatus according to any one of (1) to (4), wherein each of the plurality of vehicle batteries is supplied power by inductive charging with corresponding linear sections of the stationary power transmitter line.

(6) The apparatus according to any one of (1) to (5), wherein each of the plurality of vehicle batteries is supplied power by conductive charging with corresponding linear sections of the stationary power transmitter line.

(7) The apparatus according to any one of (1) to (6), wherein the processing circuitry is further configured to iteratively calculate a vehicle battery charge of one vehicle battery of the plurality of vehicle batteries, based on received electric charge data of the one vehicle battery, for a predetermined period of time, and cease power supplied to a corresponding linear section of the stationary power transmitter line when the iteratively calculated vehicle battery charge of the one vehicle battery is unchanged for the predetermined period of time.

(8) The apparatus according to any one of (1) to (7), wherein each of the plurality of vehicle batteries is supplied power via power receiver coupled to each of the plurality of vehicle batteries and independent of the stationary power transmitter line.

(9) A method for assembly line charging of vehicle batteries, the method comprising receiving battery data of a plurality of vehicle batteries on an assembly line, the received battery data including electric charge data of each vehicle battery of the plurality of vehicle batteries, each of the plurality of vehicle batteries being powered by a corresponding linear section of a stationary power transmitter line, calculating a vehicle battery charge of each of the plurality of vehicle batteries based on the received electric charge data of each vehicle battery, evaluating the calculated vehicle battery charge of each of the plurality of vehicle batteries relative to associated vehicle battery charge parameters, the vehicle battery charge parameters including a minimum vehicle battery charge and a maximum vehicle battery charge of each of the plurality of vehicle batteries, and adjusting, by processing circuitry, a power supplied to the corresponding linear section of the stationary power transmitter line based on the evaluation of the calculated vehicle battery charge of each of the plurality of vehicle batteries, wherein the adjusted power supplied to the corresponding linear section of the stationary power transmitter line is adjusted to optimize power distribution amongst linear sections of the stationary power transmitter line based on the evaluated vehicle battery charge of each of the plurality of vehicle batteries.

(10) The method according to (9), wherein the adjusting the power supplied to the corresponding linear section of the stationary power transmitter line includes decreasing power supplied to the corresponding linear section when an evaluated vehicle battery charge of one of the plurality of vehicle batteries indicates an associated maximum vehicle battery charge is achieved.

(11) The method according to either (9) or (10), further comprising supplying power to a linear section of the stationary power transmitter line based on a co-localization of one of the plurality of vehicle batteries with the linear section.

(12) The method according to any one of (9) to (11), wherein the evaluating the calculated vehicle battery charge of each of the plurality of vehicle batteries relative to the associated vehicle battery charge parameters includes evaluating the calculated vehicle battery charge of each of the plurality of vehicle batteries relative to a type of each of the plurality of vehicle batteries.

(13) The method according to any one of (9) to (12), further comprising supplying power to each of the plurality of vehicle batteries by inductive charging with corresponding linear sections of the stationary power transmitter line.

(14) The method according to any one of (9) to (13), further comprising supplying power to each of the plurality of vehicle batteries by conductive charging with corresponding linear sections of the stationary power transmitter line.

(15) The method according to any one of (9) to (14), further comprising calculating, iteratively, a vehicle battery charge of one vehicle battery of the plurality of vehicle batteries, based on received electric charge data of the one vehicle battery, for a predetermined period of time, and ceasing supplying power to a corresponding linear section of the stationary power transmitter line when the iteratively calculated vehicle battery charge of the one vehicle battery is unchanged for the predetermined period of time.

(16) A non-transitory computer-readable storage medium storing computer-readable instructions that, when executed by a computer, cause the computer to perform a method for assembly line charging of vehicle batteries, comprising receiving battery data of a plurality of vehicle batteries on an assembly line, the received battery data including electric charge data of each vehicle battery of the plurality of vehicle batteries, each of the plurality of vehicle batteries being powered by a corresponding linear section of a stationary power transmitter line, calculating a vehicle battery charge of each of the plurality of vehicle batteries based on the received electric charge data of each vehicle battery, evaluating the calculated vehicle battery charge of each of the plurality of vehicle batteries relative to associated vehicle battery charge parameters, the vehicle battery charge parameters including a minimum vehicle battery charge and a maximum vehicle battery charge of each of the plurality of vehicle batteries, and adjusting a power supplied to the corresponding linear section of the stationary power transmitter line based on the evaluation of the calculated vehicle battery charge of each of the plurality of vehicle batteries, wherein the adjusted power supplied to the corresponding linear section of the stationary power transmitter line is adjusted to optimize power distribution amongst linear sections of the stationary power transmitter line based on the evaluated vehicle battery charge of each of the plurality of vehicle batteries.

(17) The non-transitory computer-readable storage medium according to (16), wherein the adjusting the power supplied to the corresponding linear section of the stationary power transmitter line includes decreasing power supplied to the corresponding linear section when an evaluated vehicle battery charge of one of the plurality of vehicle batteries indicates an associated maximum vehicle battery charge is achieved.

(18) The non-transitory computer-readable storage medium according to either (16) or (17), further comprising supplying power to a linear section of the stationary power transmitter line based on a co-localization of one of the plurality of vehicle batteries with the linear section.

(19) The non-transitory computer-readable storage medium according to any one of (16) to (18), further comprising supplying power to each of the plurality of vehicle batteries by inductive charging with corresponding linear sections of the stationary power transmitter line.

(20) The non-transitory computer-readable storage medium according to any one of (16) to (19), further comprising calculating, iteratively, a vehicle battery charge of one vehicle battery of the plurality of vehicle batteries, based on received electric charge data of the one vehicle battery, for a predetermined period of time, and ceasing supplying power to a corresponding linear section of the stationary power transmitter line when the iteratively calculated vehicle battery charge of the one vehicle battery is unchanged for the predetermined period of time.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for assembly line charging of vehicle batteries, the apparatus comprising:
   processing circuitry configured to:
      receive battery data of a plurality of vehicle batteries on an assembly line for assembly of a vehicle into which one of the plurality of vehicle batteries is installed during the assembly of the vehicle, the received battery data including electric charge data of each vehicle battery of the plurality of vehicle batteries, each of the plurality of vehicle batteries being powered by a corresponding linear section of a stationary power transmitter line,
      calculate a vehicle battery charge of the plurality of vehicle batteries based on the received electric charge data of each vehicle battery,
      evaluate the calculated vehicle battery charge of each of the plurality of vehicle batteries relative to associated vehicle battery charge parameters, the vehicle battery charge parameters including a minimum vehicle battery charge and a maximum vehicle battery charge of each of the plurality of vehicle batteries, and
      adjust a power supplied to the corresponding linear section of the stationary power transmitter line during the assembly of the vehicle into which the one of the plurality of vehicle batteries is installed based on the evaluation of the calculated vehicle battery charge of each of the plurality of vehicle batteries.

2. The apparatus according to claim 1, wherein the processing circuitry is further configured to adjust the power supplied to the plurality of vehicle batteries by, when the vehicle battery charge indicates a maximum vehicle battery charge is achieved, decreasing power supplied to the plurality of vehicle batteries.

3. The apparatus according to claim 1, wherein the processing circuitry is further configured to supply power to the plurality of vehicle batteries based on a co-localization of the one of the plurality of vehicle batteries within the assembly line.

4. The apparatus according to claim 1, wherein the battery data includes the electric charge data of the plurality of vehicle batteries and a type of the plurality of vehicle batteries.

5. The apparatus according to claim 1, wherein the plurality of vehicle batteries is supplied power by inductive charging.

6. The apparatus according to claim 1, wherein the plurality of vehicle batteries is supplied power by conductive charging.

7. The apparatus according to claim 1, wherein the processing circuitry is further configured to:
   iteratively calculate the vehicle battery charge of the plurality of vehicle batteries for a predetermined period of time, and
   cease power supplied to the plurality of vehicle batteries when the iteratively calculated vehicle battery charge is unchanged for the predetermined period of time.

8. The apparatus according to claim 1, wherein the plurality of vehicle batteries is supplied power via a power receiver coupled to the plurality of vehicle batteries.

9. A method for assembly line charging of vehicle batteries, the method comprising:
   receiving battery data of a plurality of vehicle batteries on an assembly line for assembly of a vehicle into which one of the plurality of vehicle batteries is installed during the assembly of the vehicle, the received battery data including electric charge data of each vehicle battery of the plurality of vehicle batteries, each of the plurality of vehicle batteries being powered by a corresponding linear section of a stationary power transmitter line;
   calculating a vehicle battery charge of the plurality of vehicle batteries based on the received electric charge data of each vehicle battery;
   evaluating the calculated vehicle battery charge of each of the plurality of vehicle batteries relative to associated vehicle battery charge parameters, the vehicle battery charge parameters including a minimum vehicle battery charge and a maximum vehicle battery charge of each of the plurality of vehicle batteries; and
   adjusting, by processing circuitry, a power supplied to the corresponding linear section of the stationary power transmitter line during the assembly of the vehicle into which the one of the plurality of vehicle batteries is installed based on the evaluation of the calculated vehicle battery charge of each of the plurality of vehicle batteries.

10. The method according to claim 9, wherein the adjusting the power supplied to the plurality of vehicle batteries includes decreasing power supplied to the plurality of vehicle batteries when the vehicle battery charge indicates a maximum vehicle battery charge is achieved.

11. The method according to claim 9, further comprising supplying power to the plurality of vehicle batteries based on a co-localization of the one of the plurality of vehicle batteries within the assembly line.

12. The method according to claim 9, wherein the battery data includes the electric charge data of the plurality of vehicle batteries and a type of the plurality of vehicle batteries.

13. The method according to claim 9, further comprising supplying power to the plurality of vehicle batteries by inductive charging.

14. The method according to claim 9, further comprising supplying power to the plurality of vehicle batteries by conductive charging.

15. The method according to claim 9, further comprising:
   calculating, iteratively, the vehicle battery charge of the plurality of vehicle batteries for a predetermined period of time; and
   ceasing supplying power to the plurality of vehicle batteries when the iteratively calculated vehicle battery charge is unchanged for the predetermined period of time.

16. A non-transitory computer-readable storage medium storing computer-readable instructions that, when executed by a computer, cause the computer to perform a method for assembly line charging of vehicle batteries, comprising:
   receiving battery data of a plurality of vehicle batteries on an assembly line for assembly of a vehicle into which one of the plurality of vehicle batteries is installed during the assembly of the vehicle, the received battery data including electric charge data of each vehicle battery of the plurality of vehicle batteries, each of the plurality of vehicle batteries being powered by a corresponding linear section of a stationary power transmitter line;

calculating a vehicle battery charge of the plurality of vehicle batteries based on the received electric charge data of each vehicle battery;

evaluating the calculated vehicle battery charge of each of the plurality of vehicle batteries relative to associated vehicle battery charge parameters, the vehicle battery charge parameters including a minimum vehicle battery charge and a maximum vehicle battery charge of each of the plurality of vehicle batteries; and adjusting a power supplied to the corresponding linear section of the stationary power transmitter line during the assembly of the vehicle into which the one of the plurality of vehicle batteries is installed based on the evaluation of the calculated vehicle battery charge of each of the plurality of vehicle batteries.

17. The non-transitory computer-readable storage medium according to claim 16, wherein the adjusting the power supplied to the plurality of vehicle batteries includes decreasing power supplied to the plurality of vehicle batteries when the vehicle battery charge indicates a maximum vehicle battery charge is achieved.

18. The non-transitory computer-readable storage medium according to claim 16, further comprising supplying power the plurality of vehicle batteries based on a co-localization of the one of the plurality of vehicle batteries within the assembly line.

19. The non-transitory computer-readable storage medium according to claim 16, further comprising supplying power to the plurality of vehicle batteries by inductive charging.

20. The non-transitory computer-readable storage medium according to claim 16, further comprising:
calculating, iteratively, the vehicle battery charge of the plurality of vehicle batteries for a predetermined period of time; and
ceasing supplying power to the plurality of vehicle batteries when the iteratively calculated vehicle battery charge is unchanged for the predetermined period of time.

* * * * *